(12) United States Patent
Lim et al.

(10) Patent No.: US 10,323,677 B2
(45) Date of Patent: Jun. 18, 2019

(54) SYSTEM, APPARATUS, AND METHOD FOR SECURING STRUCTURES

(71) Applicant: Motorola Mobility LLC, Chicago, IL (US)

(72) Inventors: David K Lim, Glenview, IL (US); Paul Fordham, Wauconda, IL (US); Mark Daniel Jannick, Glen Ellyn, IL (US); Eric J. Kutchery, Salem, WI (US); Pavana Abhiram Sirimamilla, Olympia, WA (US)

(73) Assignee: Motorola Mobility LLC, Chicago, IL (US)

( * ) Notice: Subject to any disclaimer, the term of this patent is extended or adjusted under 35 U.S.C. 154(b) by 412 days.

(21) Appl. No.: 15/176,965

(22) Filed: Jun. 8, 2016

(65) Prior Publication Data
US 2017/0356486 A1 Dec. 14, 2017

(51) Int. Cl.
| | |
|---|---|
| *F16B 39/282* | (2006.01) |
| *F16B 5/02* | (2006.01) |
| *F16B 1/00* | (2006.01) |
| *F16B 5/00* | (2006.01) |
| *F16M 1/00* | (2006.01) |
| *F16B 23/00* | (2006.01) |
| *G06F 1/16* | (2006.01) |

(52) U.S. Cl.
CPC .......... *F16B 39/282* (2013.01); *F16B 5/0024* (2013.01); *F16B 5/02* (2013.01); *F16B 5/025* (2013.01); *F16B 23/0061* (2013.01); *F16M 1/00* (2013.01); *G06F 1/16* (2013.01); *F16B 2001/0035* (2013.01); *Y10T 403/1624* (2015.01); *Y10T 403/335* (2015.01); *Y10T 403/75* (2015.01)

(58) Field of Classification Search
CPC .......... F16B 5/0024; F16B 5/02; F16B 5/025; F16B 23/0061; F16B 39/282; F16B 2001/0035; F16B 2001/0092; H04M 1/0249; H04M 1/026; Y10T 403/1616; Y10T 403/1624; Y10T 403/33; Y10T 403/335; Y10T 403/75; G06F 1/16; F06F 1/16
USPC ............ 411/379, 380; 403/13, 14, 167, 168, 403/408.1, DIG. 1
See application file for complete search history.

(56) References Cited

U.S. PATENT DOCUMENTS 1,399,942 A * 12/1921 Dowd ....................... F22B 7/16
411/379
1,507,841 A * 9/1924 Landgraf .................. F22B 7/16
411/380

(Continued)

FOREIGN PATENT DOCUMENTS

| CN | 202690672 U | 1/2013 |
| CN | 205908603 U | 1/2017 |

(Continued)

*Primary Examiner* — Josh Skroupa
(74) *Attorney, Agent, or Firm* — Kunzler Bean & Adamson

(57) ABSTRACT

Systems, methods, and devices for securing structures include a fastener that includes a threaded body and a head. The head includes a rounded axial protrusion having a first radial diameter, and a noncircular radial portion for securing the fastener. The noncircular radial portion has a second radial diameter greater than the first radial diameter. The noncircular radial portion is positioned between the threaded body and the rounded axial protrusion.

16 Claims, 8 Drawing Sheets

(56) References Cited

U.S. PATENT DOCUMENTS

| | | | | |
|---|---|---|---|---|
| 4,006,660 | A * | 2/1977 | Yamamoto | F16B 23/0061 411/405 |
| 6,017,177 | A * | 1/2000 | Lanham | F16B 23/003 411/402 |
| 6,077,267 | A * | 6/2000 | Huene | F16B 23/0061 411/405 |
| 6,648,412 | B2 * | 11/2003 | Moradell | F16B 5/025 297/354.12 |
| 6,746,172 | B2 * | 6/2004 | Culpepper | F16M 7/00 403/13 |
| 7,217,059 | B1 * | 5/2007 | Rudduck | E04B 2/7457 403/DIG. 1 |
| 7,261,489 | B2 * | 8/2007 | Arbona | B62D 29/048 403/408.1 |
| 8,647,009 | B2 * | 2/2014 | Kobayashi | F24S 25/61 403/167 |
| 9,328,764 | B2 * | 5/2016 | Plickys | F16B 5/0275 |
| 9,434,068 | B2 * | 9/2016 | Frisk | B25J 9/10 |
| 9,810,252 | B2 * | 11/2017 | Aikawa | F16B 5/0642 |
| 2015/0101458 | A1 * | 4/2015 | Saje | B25B 13/065 81/121.1 |
| 2017/0268547 | A1 * | 9/2017 | Mori | F16B 5/02 |

FOREIGN PATENT DOCUMENTS

| | | | | |
|---|---|---|---|---|
| DE | 102015200291 | A1 | 7/2016 | |
| GB | 1159640 | A * | 7/1969 | F16B 23/003 |
| GB | 2465371 | A | 5/2010 | |

* cited by examiner

SYSTEM, APPARATUS, AND METHOD FOR SECURING STRUCTURES

FIELD

The subject matter disclosed herein relates to fasteners and more particularly relates to securing structures using fasteners.

BACKGROUND

Description of the Related Art

Information handling devices, such as desktop computers, laptop computers, tablet computers, smart phones, optical head-mounted display units, smart watches, cameras, etc., are ubiquitous in society. Such information handling devices may include fasteners. Fasteners may interfere with attaching structures together.

BRIEF SUMMARY

A system and device for securing structures are disclosed. A method to manufacture the system is also disclosed. In one embodiment, the system includes a fastener including a threaded body and a head. The head includes a rounded axial protrusion having a first radial diameter, and a noncircular radial portion for securing the fastener. The noncircular radial portion has a second radial diameter greater than the first radial diameter. The noncircular radial portion is positioned between the threaded body and the rounded axial protrusion. The system also includes a first structure having an opening in which the threaded body of the fastener is secured. The system includes a second structure disposed adjacent to the first structure. The second structure includes a concave portion positioned around the rounded axial protrusion of the head of the fastener to facilitate positioning of the first structure relative to the second structure.

In some embodiments, the rounded axial protrusion of the head of the fastener includes a substantially paraboloidal shape. In one embodiment, the rounded axial protrusion of the head of the fastener includes a substantially rounded conical shape. In various embodiments, the noncircular radial portion of the head of the fastener includes a circular shape having radial notches. In certain embodiments, the noncircular radial portion of the head of the fastener includes a hexagonal shape. In various embodiments, the system includes an information handling device having the fastener, the first structure, and the second structure. In some embodiments, the system includes a smart phone having the fastener, the first structure, and the second structure. In one embodiment, the second structure is magnetically held to the first structure. In certain embodiments, the concave portion of the second structure abuts the rounded axial protrusion of the head of the fastener to block movement of the rounded axial protrusion relative to the concave portion of the second structure in a plurality of directions parallel to adjacent surfaces of the first and second structures.

A method for securing structures, in one embodiment, includes securing a threaded body of a fastener into an opening in a first structure. In certain embodiments, the fastener includes a threaded body and a head. The head includes a rounded axial protrusion having a first radial diameter, and a noncircular radial portion for securing the fastener. The noncircular radial portion has a second radial diameter greater than the first radial diameter. The noncircular radial portion is positioned between the threaded body and the rounded axial protrusion. The method, in some embodiments, includes magnetically securing a second structure to the first structure. The second structure includes a concave portion positioned around the rounded axial protrusion of the head of the fastener to facilitate positioning of the first structure relative to the second structure.

In certain embodiments, the concave portion of the second structure abuts the rounded axial protrusion of the head of the fastener to block movement of the rounded axial protrusion relative to the concave portion of the second structure in multiple directions parallel to adjacent surfaces of the first and second structures. In some embodiments, the noncircular radial portion of the head of the fastener includes a circular shape having radial notches. In various embodiments, securing the threaded body of the fastener into the opening in the first structure includes rotating a tool configured to be inserted into the radial notches of the head. In one embodiment, the rounded axial protrusion of the head of the fastener includes a substantially paraboloidal shape. In certain embodiments, the rounded axial protrusion of the head of the fastener includes a substantially rounded conical shape.

In one embodiment, a fastener includes a threaded body and a head. The head includes a rounded axial protrusion having a first radial diameter, and a noncircular radial portion for securing the fastener. The noncircular radial portion has a second radial diameter greater than the first radial diameter. The noncircular radial portion is positioned between the threaded body and the rounded axial protrusion.

In some embodiments, the rounded axial protrusion of the head of the fastener includes a substantially paraboloidal shape. In one embodiment, the rounded axial protrusion of the head of the fastener includes a substantially rounded conical shape. In various embodiments, the noncircular radial portion of the head of the fastener includes a circular shape having radial notches. In certain embodiments, the noncircular radial portion of the head of the fastener includes a hexagonal shape.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, or method. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. One skilled in the relevant art will recognize that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some implementations, the functions noted in blocks of flow charts may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment.

The description of elements in each figure may refer to elements of proceeding figures. Like numbers refer to like elements in all figures, including alternate embodiments of like elements.

Figure 1:
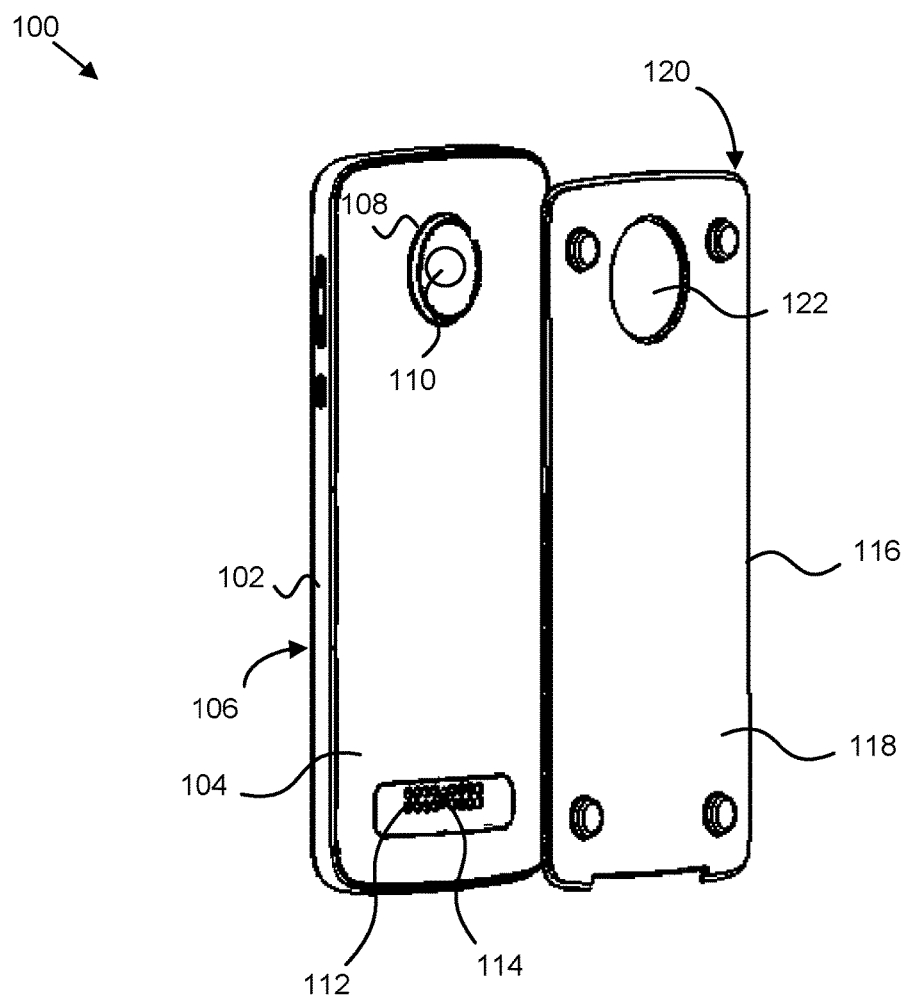
FIG. 1 is a perspective view illustrating one embodiment of a system including an information handling device and an attachment module.

FIG. 1 depicts one embodiment of a system 100 including an information handling device 102 and an attachment module 116. The system 100 and/or the information handling device 102 may be any suitable device, such as a smart phone, a personal digital assistant, a television, a tablet computer, a table computer, a notebook (laptop) computer, a personal computer, a vehicle dashboard, and so forth. The information handling device 102 may include a processor, a memory, an input device, and/or a display device. In some embodiments, the input device and the display device are combined into a single device, such as a touchscreen.

The processor, in one embodiment, may include any known controller capable of executing computer-readable instructions and/or capable of performing logical operations. For example, the processor may be a microcontroller, a microprocessor, a central processing unit ("CPU"), a graphics processing unit ("GPU"), an auxiliary processing unit, a field programmable gate array ("FPGA"), or similar programmable controller.

The memory, in one embodiment, is a computer readable storage medium. In some embodiments, the memory includes volatile computer storage media. For example, the memory may include a RAM, including dynamic RAM ("DRAM"), synchronous dynamic RAM ("SDRAM"), and/or static RAM ("SRAM"). In some embodiments, the memory includes non-volatile computer storage media. For example, the memory may include a hard disk drive, a flash memory, or any other suitable non-volatile computer storage device. In some embodiments, the memory includes both volatile and non-volatile computer storage media.

The input device, in one embodiment, may include any known input device including a touch panel, a button, a keyboard, a stylus, or the like. In some embodiments, the input device may be integrated with the display device, for example, as a touchscreen or similar touch-sensitive display. In some embodiments, the input device includes a touchscreen. In some embodiments, the input device includes two or more different devices, such as a keyboard and a touch panel.

The display device, in one embodiment, may include any known electronically controllable display or display device. The display device may be designed to output visual, audible, and/or haptic signals. In some embodiments, the display device includes an electronic display capable of outputting visual data to a user. For example, the display device may include, but is not limited to, an LCD display, an LED display, an OLED display, a projector, or similar display device capable of outputting images, text, or the like to a user. As another, non-limiting, example, the display device may include a wearable display such as a smart watch, smart glasses, a heads-up display, or the like. Further, the display device may be a component of a smart phone, a personal digital assistant, a television, a tablet computer, a table computer, a notebook (laptop) computer, a personal computer, a vehicle dashboard, or the like.

In certain embodiments, the display device includes one or more speakers for producing sound. In some embodiments, the display device includes one or more haptic devices for producing vibrations, motion, or other haptic feedback. In some embodiments, all or portions of the display device may be integrated with the input device. For example, the input device and display device may form a touchscreen or similar touch-sensitive display. In other embodiments, the display device may be located near the input device.

The information handling device 102 (or structure) includes a first surface 104 and a second surface 106 opposite the first surface 104. The first surface 104, in one embodiment, includes a bezel protrusion 108 housing a camera 110, sockets 112, and a concave portion 114. Although the first surface 104 includes sockets 112, in other embodiments the first surface 104 may include pins, or another type of contact. Moreover, in various embodiments, the concave portion 114 may be replaced by a convex portion. The concave portion 114 is positioned so that 8 sockets 112 are on each of two different sides of the concave portion 114. The second surface 106 may include an input device and/or a display device.

The attachment module 116 (or structure) includes a first surface 118 and a second surface 120 opposite the first surface 118. An opening 122 in the attachment module 116 extends through the first surface 118 and the second surface 120. The second surface 120 of the attachment module 116 is configured to mate with the first surface 104 of the information handling device 102. To mate together, the bezel protrusion 108 is inserted into the opening 122. Further, the sockets 112 of the information handling device 102 contact pins disposed on the second surface 120 of the attachment module 116 to make an electrical connection for transmitting information and/or power between the information handling device 102 and the attachment module 116. Moreover, a head of a fastener disposed on the second surface 120 of the attachment module 116 is inserted into the concave portion 114 of the first surface 104 of the information handling device 102. The head of the fastener facilitates properly locating the second surface 120 of the attachment module 116 to the first surface 104 of the information handling device 102. As may be appreciated, other features on the second surface 120 of the attachment module 116 and/or the first surface 104 of the information handling device 102 may work together with the head of the fastener and the concave portion 114 to facilitate properly locating the second surface 120 of the attachment module 116 to the first surface 104 of the information handling device 102. For example, the bezel protrusion 108 and the opening 122 may facilitate properly locating the second surface 120 of the attachment module 116 to the first surface 104 of the information handling device 102. As another example, the sockets 112 and pins on the second surface 120 of the attachment module 116 may facilitate properly locating the second surface 120 of the attachment module 116 to the first surface 104 of the information handling device 102.

In certain embodiments, magnetic features in the information handling device 102 and/or the attachment module 116 facilitate mating, securing, attaching, coupling, connecting, and/or holding the information handling device 102 and the attachment module 116 together. With the attachment module 116 attached to the information handling device 102, the information handling device 102 may use resources made available by the attachment module 116.

Figure 2:
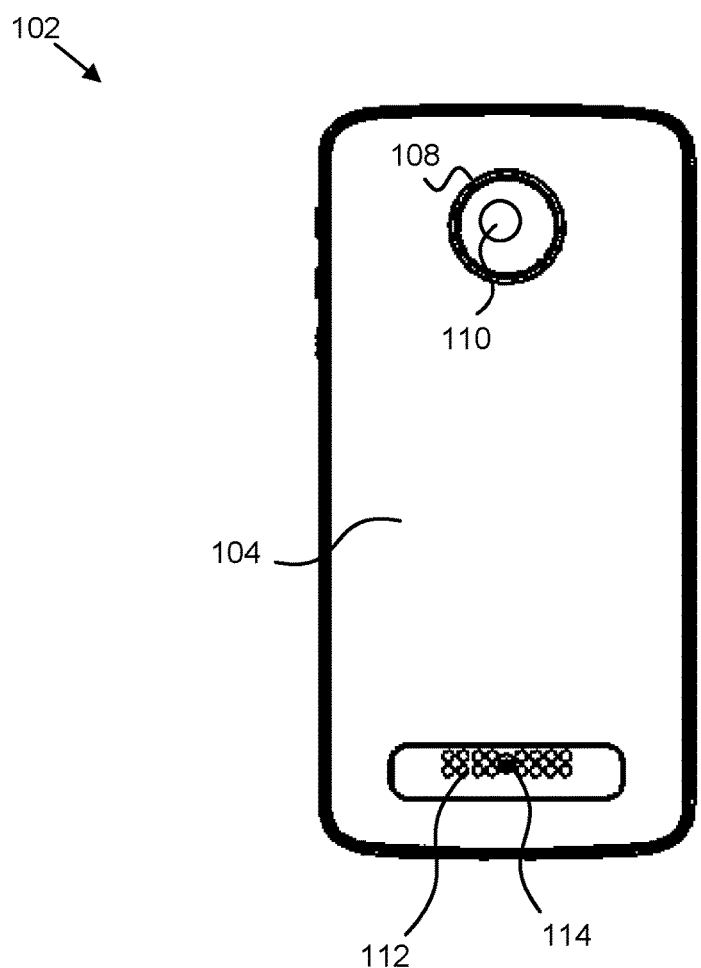
FIG. 2 is a side view illustrating one embodiment of the information handling device of FIG. 1.

FIG. 2 depicts a side view of one embodiment of the information handling device 102 of FIG. 1. This depicted view further illustrates the bezel protrusion 108 housing the camera 110, the sockets 112, and the concave portion 114.

Figure 3:
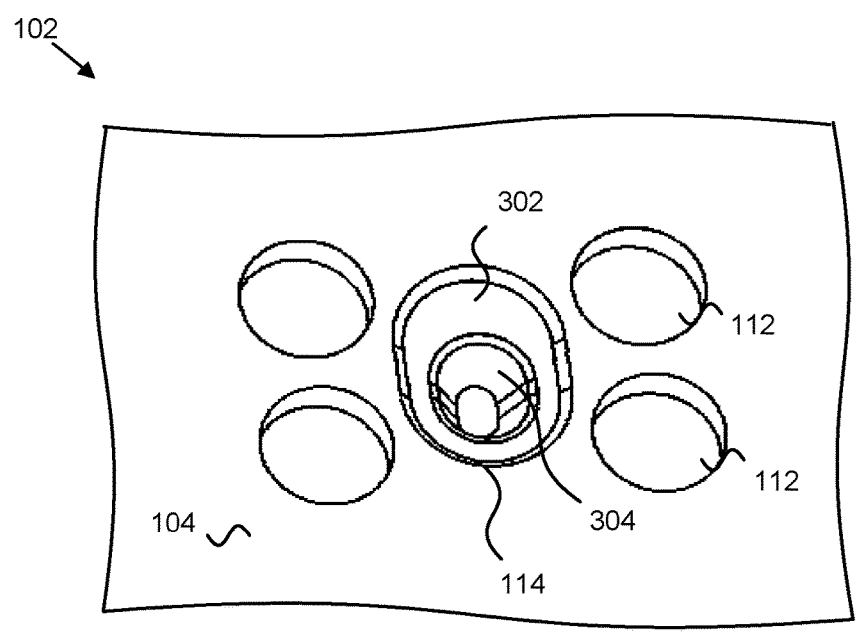
FIG. 3 is a close-up side view illustrating one embodiment of the information handling device of FIG. 1.

FIG. 3 depicts a close-up side view of one embodiment of the information handling device 102 of FIG. 1. Two sockets 112 on each side of the concave portion 114 are illustrated. Moreover, the concave portion 114 includes a first portion 302 and a second portion 304. The first portion 302 has a larger circumference than the second portion 304. Furthermore, the second portion 304 extends a greater depth relative to the first surface 104 than the first portion 302.

Figure 4:
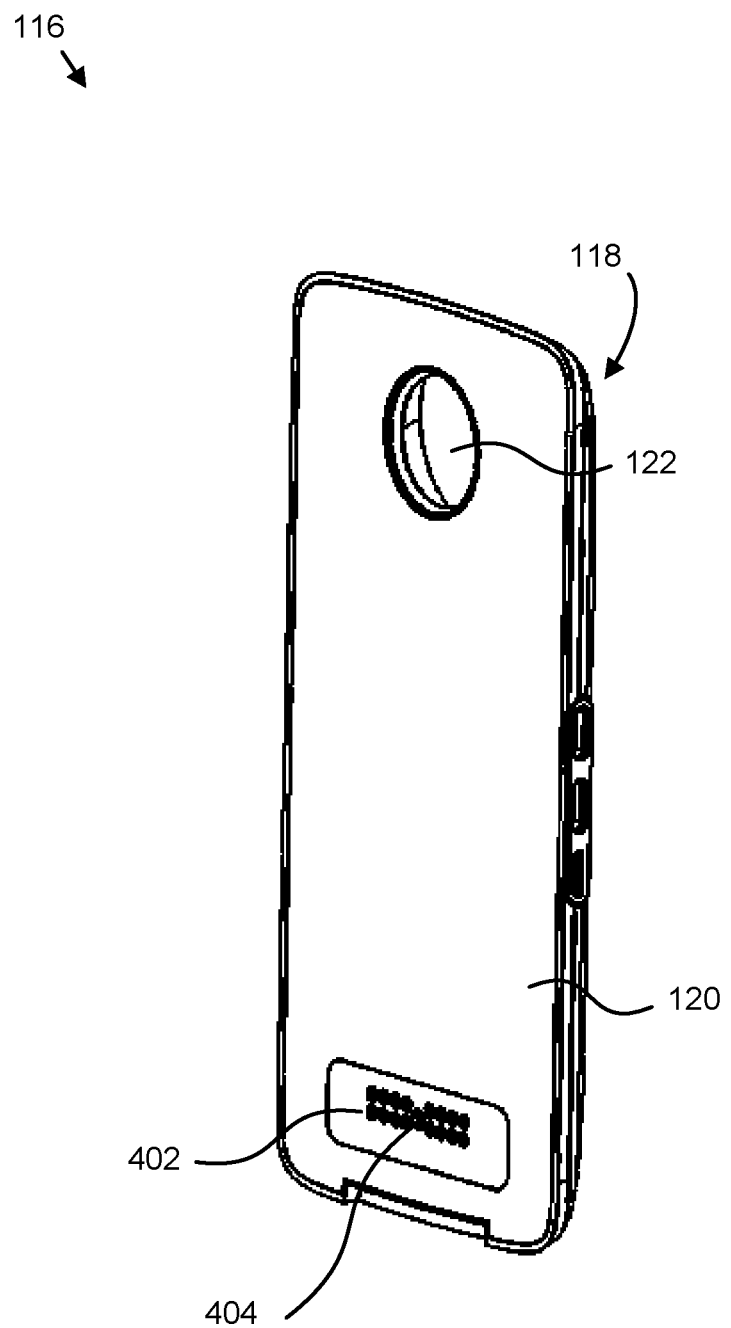
FIG. 4 is a perspective view illustrating one embodiment of the attachment module of FIG. 1 that includes a fastener.

FIG. 4 depicts a perspective view of one embodiment of the attachment module 116 of FIG. 1 that includes a fastener 404. The second surface 120 of the attachment module 116 is illustrated. The second surface 120 includes pins 402 and the fastener 404. As may be appreciated, in certain embodiments, the pins 402 may be replaced by sockets or another type of contact. The fastener 404 is positioned so that 8 pins 402 are on each of two different sides of the fastener 404.

Figure 5:
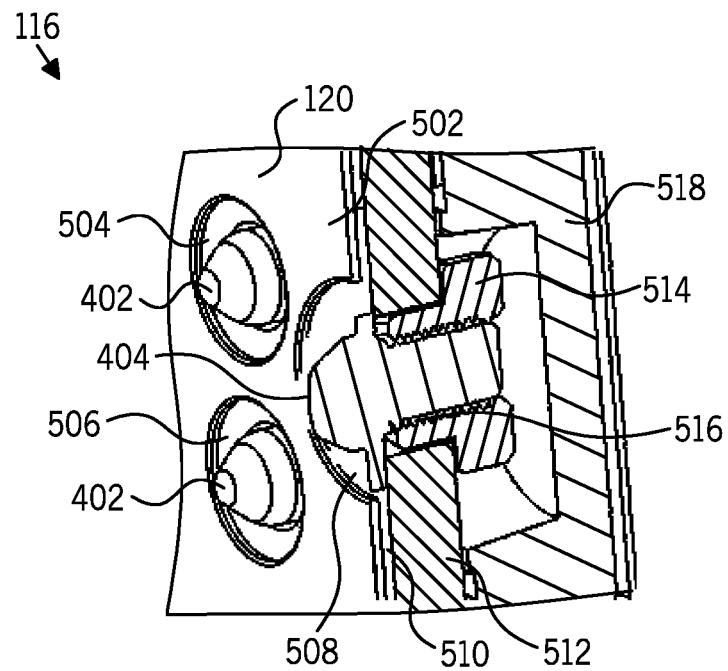
FIG. 5 is a cross-sectional view illustrating one embodiment of the attachment module of FIG. 1.
Figure 6:
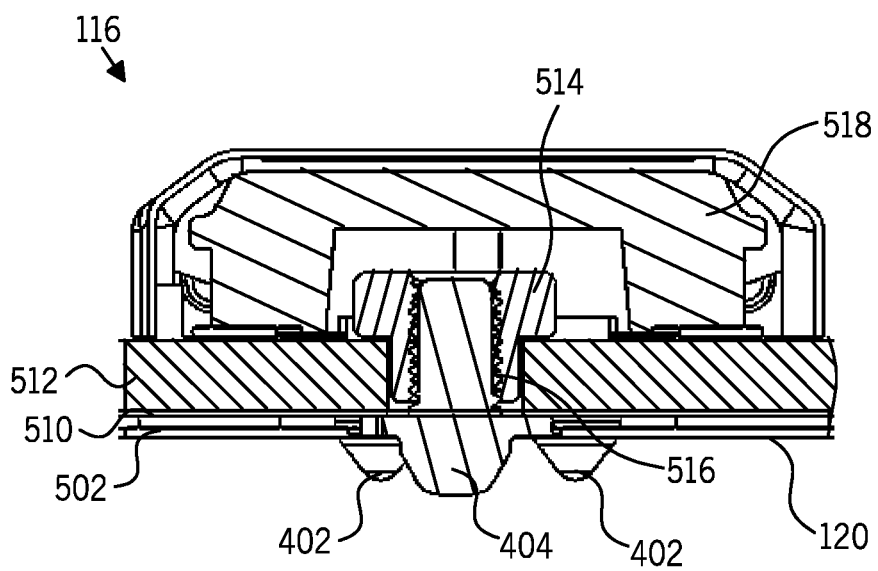
FIG. 6 is another cross-sectional view illustrating one embodiment of the attachment module of FIG. 1.

FIG. 5 depicts a cross-sectional view of one embodiment of the attachment module 116 of FIG. 1. The second surface 120 of the attachment module 116 includes a first layer 502 (e.g., surface layer) having openings 504 and 506 through which the pins 402 protrude. Moreover, the fastener 404 protrudes through an opening 508 in the first layer 502. The attachment module 116 includes a second layer 510 below the first layer 502, and a third layer 512 below the second layer 510. A retainer 514 is inserted into an opening in the third layer 512. The retainer 514 includes an opening 516 through which the fastener 404 is inserted. Upon securing the fastener 404, a ring of the retainer 514 abuts one side of the third layer 512 and a head of the fastener 404 abuts the opposite side of the third layer 512. A cover 518 is disposed around a body portion of the fastener 404 that extends into the attachment module 116 beyond the third layer 512. FIG. 6 depicts another cross-sectional view of one embodiment of the attachment module 116 of FIG. 1.

Figure 7:
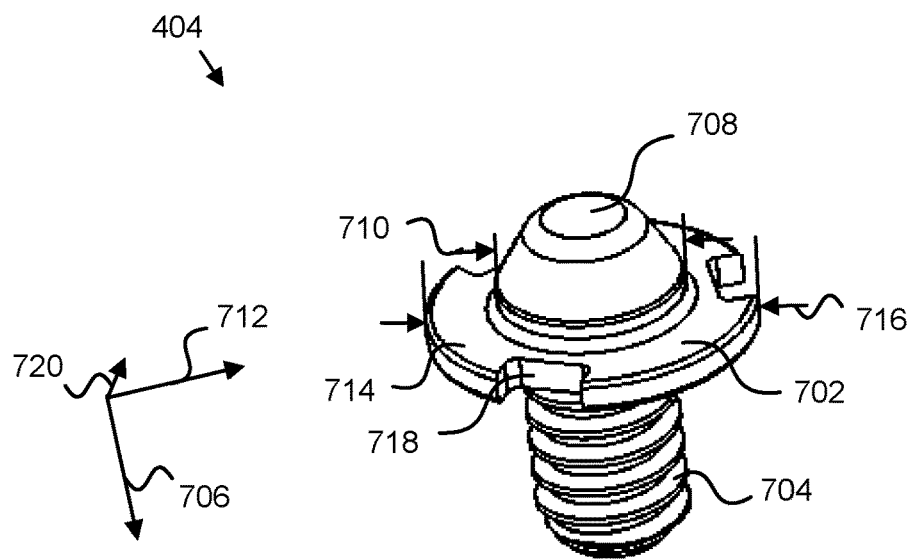
FIG. 7 is a perspective view illustrating one embodiment of the fastener of FIG. 4.

FIG. 7 depicts a perspective view of one embodiment of the fastener 404 of FIG. 4. The fastener 404 includes a head 702, and a threaded body 704 that extends in an axial direction 706. Moreover, the head 702 includes a rounded axial protrusion 708 that extends in the axial direction 706. The rounded axial protrusion 708 has a base radial diameter 710 that extends in a radial direction 712. The rounded axial protrusion 708 may be any rounded type of shape, such as a paraboloidal shape, a hemispherical shape, a rounded conical shape, a mushroom shape, and so forth. Moreover, the rounded axial protrusion 708 may be generally smooth, such that it does not include features suitable for securing the fastener 404. In certain embodiments, the rounded axial protrusion 708 may be polished and coated with a material to reduce abrasion. In some embodiments, the base of the rounded axial protrusion 708 may be circular.

A noncircular radial portion 714 facilitates securing the fastener 404. The noncircular radial portion 714 is positioned between the threaded body 704 and the rounded axial protrusion 708. The noncircular radial portion 714 has a radial diameter 716 that extends in the radial direction 712 and is greater than the radial diameter 710. To facilitate securing the fastener 404, the noncircular radial portion 714 includes radial notches 718 that reduce the radial diameter 716 in the radial direction 712 at predetermined locations. The radial notches 718 facilitate insertion of a tool for securing and/or removing the fastener 404. The noncircular radial portion 714 may be considered as having a circular shape with the radial notches 718, thus being noncircular. As used herein, a radial direction 720 may be rotated approximately 90 degrees relative to the radial direction 712.

Figure 8:
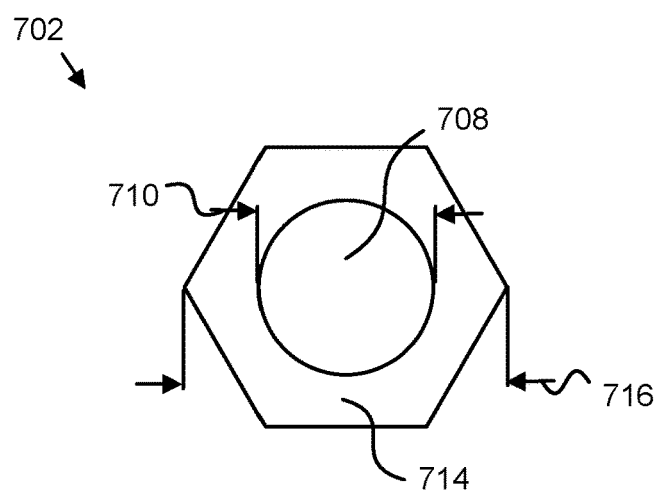
FIG. 8 is a top view illustrating one embodiment of a head of the fastener of FIG. 4.

FIG. 8 depicts a top view of one embodiment of the head 702 of the fastener 404 of FIG. 4. In the illustrated embodiment, the noncircular radial portion 714 has a hexagonal shape. As may be appreciated, the noncircular radial portion 714 may have any suitable shape to facilitate securing the fastener 404.

Figure 9:
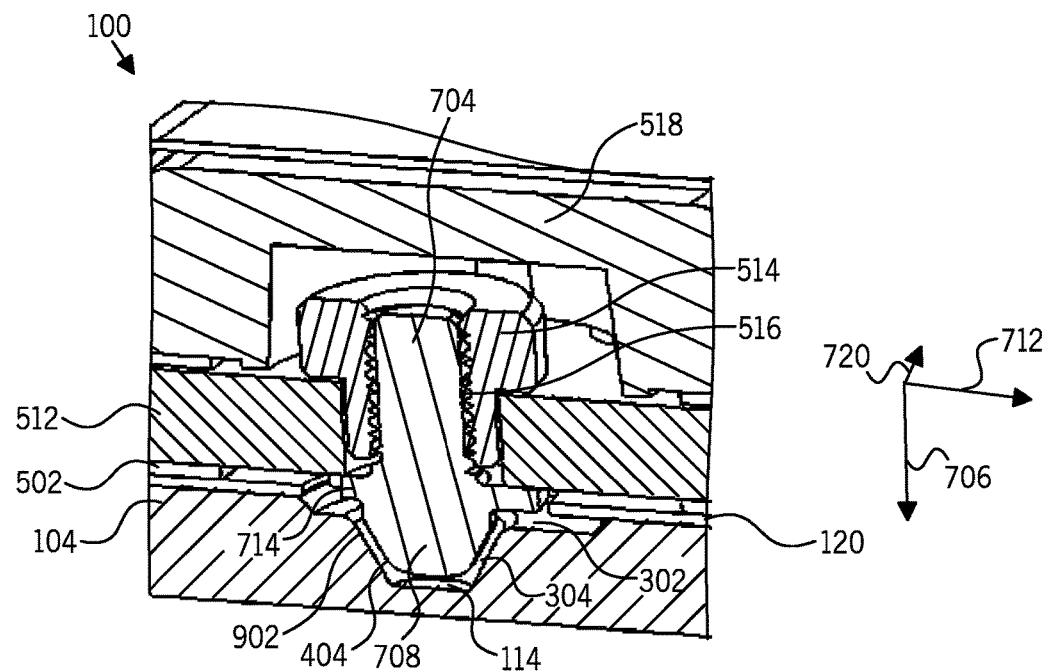
FIG. 9 is a cross-sectional view illustrating one embodiment of the system of FIG. 1.
Figure 10:
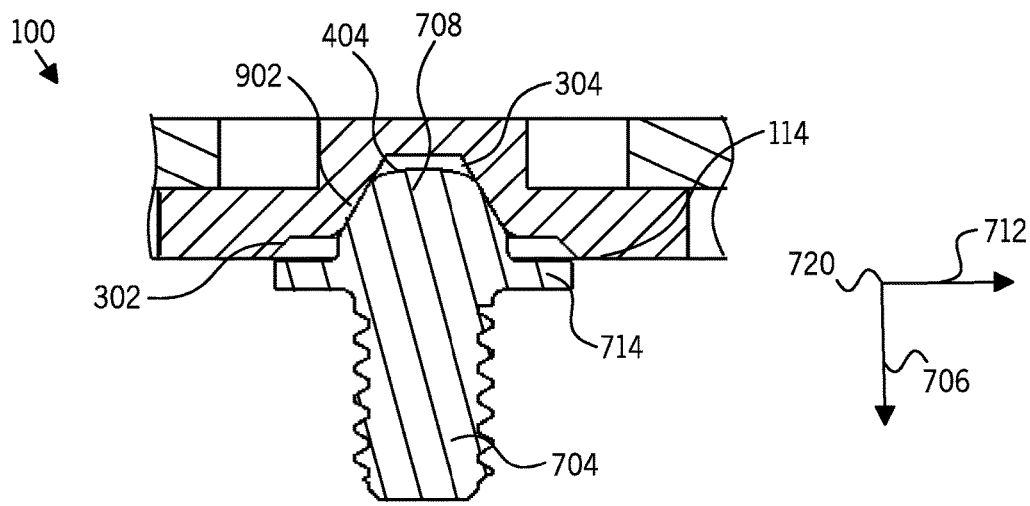
FIG. 10 is another cross-sectional view illustrating one embodiment of the system of FIG. 1.

FIG. 9 depicts a cross-sectional view of one embodiment of the system 100 of FIG. 1. As illustrated, the information handling device 102 and the attachment module 116 are mated together such that the first surface 104 of the information handling device 102 is magnetically held to the second surface 120 of the attachment module 116. The concave portion 114 of the first surface 104 of the information handling device 102 is positioned around the rounded axial protrusion 708 of the head 702 of the fastener 404 such that the first surface 104 of the information handling device 102 is properly located relative to the second surface 120 of the attachment module 116. In certain embodiments, a section 902 of the concave portion 114 of the first surface 104 abuts (e.g., contacts) at least part of the rounded axial protrusion 708 to block movement of the rounded axial protrusion 708 relative to the concave portion 114 of the first surface 104 in the radial directions 712 and 720 that are parallel to the first surface 104 of the information handling device 102 and the second surface 120 of the attachment module 116. FIG. 10 depicts another cross-sectional view of one embodiment of the system 100 of FIG. 1. As illustrated, the slope of the section 902 of the concave portion 114 facilitates contact between the section 902 of the concave portion 114 and the rounded axial protrusion 708.

Figure 11:
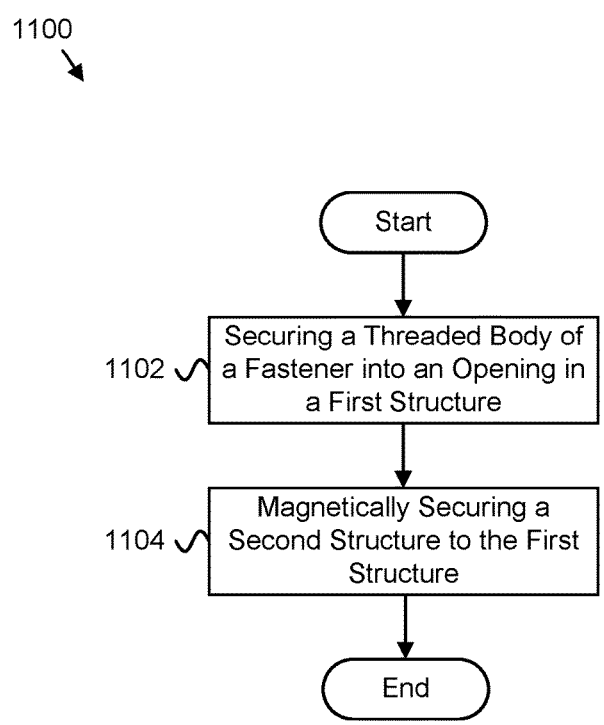
FIG. 11 is a schematic flow chart diagram illustrating one embodiment of a method for securing structures.

FIG. 11 is a schematic flow chart diagram illustrating one embodiment of a method 1100 for securing structures. As may be appreciated, the method 1100 may be performed at least in part manually and/or using one or more machines.

The method 1100 may include securing 1102 the threaded body 704 of the fastener 404 into the opening 516 in the second surface 120 of the attachment module 116 (e.g., structure). In one embodiment, securing 1102 the threaded body 704 into the opening 516 includes rotating a tool configured to be inserted into the radial notches 718 of the head 702 of the fastener 404. In various embodiments, the method 1100 may include magnetically securing 1104 the first surface 104 of the information handling device 102 (e.g., structure) to the attachment module 116. In such embodiments, the first surface 104 of the information handling device 102 includes the concave portion 114 positioned around the rounded axial protrusion 708 of the fastener 404 to facilitate positioning of the attachment module 116 relative to the information handling device 102.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a fastener comprising:
      a threaded body; and
      a head comprising:
         a rounded axial protrusion having a first radial diameter; and
         a noncircular radial portion for securing the fastener, the noncircular radial portion having a second radial diameter greater than the first radial diameter, wherein the noncircular radial portion is positioned between the threaded body and the rounded axial protrusion;
   a first structure comprising an opening in which the threaded body of the fastener is secured, wherein the threaded body extends completely through the first structure; and
   a second structure disposed adjacent to the first structure, wherein the second structure comprises a concave portion positioned around the rounded axial protrusion of the head of the fastener to facilitate positioning of the first structure relative to the second structure.

2. The system of claim 1, wherein the rounded axial protrusion of the head of the fastener comprises a substantially rounded conical shape.

3. The system of claim 1, wherein the noncircular radial portion of the head of the fastener comprises a circular shape having radial notches.

4. The system of claim 1, wherein the noncircular radial portion of the head of the fastener comprises a hexagonal shape.

5. The system of claim 1, further comprising an information handling device comprising the fastener, the first structure, and the second structure.

6. The system of claim 1, further comprising a smart phone comprising the fastener, the first structure, and the second structure.

7. The system of claim 1, wherein the second structure is magnetically held to the first structure.

8. The system of claim 1, wherein the concave portion of the second structure abuts the rounded axial protrusion of the head of the fastener to block movement of the rounded axial protrusion relative to the concave portion of the second structure in a plurality of directions parallel to adjacent surfaces of the first and second structures.

9. A method comprising:
   securing a threaded body of a fastener into an opening in a first structure, wherein the threaded body extends completely through the first structure, and the fastener comprises:
      the threaded body; and
      a head comprising:
         a rounded axial protrusion having a first radial diameter; and
         a noncircular radial portion for securing the fastener, the noncircular radial portion having a second radial diameter greater than the first radial diameter, wherein the noncircular radial portion is positioned between the threaded body and the rounded axial protrusion; and
   magnetically securing a second structure to the first structure, wherein the second structure comprises a concave portion positioned around the rounded axial protrusion of the head of the fastener to facilitate positioning of the first structure relative to the second structure.

10. The method of claim 9, wherein the concave portion of the second structure abuts the rounded axial protrusion of the head of the fastener to block movement of the rounded axial protrusion relative to the concave portion of the second structure in a plurality of directions parallel to adjacent surfaces of the first and second structures.

11. The method of claim 9, wherein the noncircular radial portion of the head of the fastener comprises a circular shape having radial notches.

12. The method of claim 9, wherein the rounded axial protrusion of the head of the fastener comprises a substantially rounded conical shape.

13. A fastener system comprising:
   a fastener comprising:
      a threaded body; and
      a head comprising:
         a rounded axial protrusion having a first radial diameter; and
         a noncircular radial portion for securing the fastener, the noncircular radial portion having a second radial diameter greater than the first radial diameter, wherein the noncircular radial portion is positioned between the threaded body and the rounded axial protrusion;
   a retainer comprising a ring and a first opening through which the threaded body is inserted; and
   a first structure comprising a second opening, wherein the threaded body extends completely through the first structure, the retainer is secured to the threaded body such that the ring of the retainer abuts a first side of the first structure and the head of the fastener abuts a second side of the first structure opposite the first side, and a portion of the retainer extends into the second opening of the first structure.

14. The fastener system of claim 13, wherein the rounded axial protrusion of the head comprises a substantially rounded conical shape.

15. The fastener system of claim 13, wherein the noncircular radial portion of the head comprises a circular shape having radial notches.

16. The fastener system of claim 13, wherein the noncircular radial portion of the head comprises a hexagonal shape.

* * * * *